United States Patent [19]

Carrick

[11] 4,011,958
[45] Mar. 15, 1977

[54] BOAT TRAILER

[75] Inventor: Lawrence K. Carrick, Spokane, Wash.

[73] Assignee: Calkins Manufacturing Company, Spokane, Wash.

[22] Filed: Aug. 4, 1975

[21] Appl. No.: 601,916

[52] U.S. Cl. ................................. 214/84; 9/1.2; 280/414 R

[51] Int. Cl.² ........................................ B60P 1/52

[58] Field of Search ............ 214/84, 85, 500, 505, 214/506; 9/1 T, 1.2; 280/414 R

[56] References Cited

UNITED STATES PATENTS

| | | | |
|---|---|---|---|
| 3,021,969 | 2/1962 | Peake et al. | 214/84 |
| 3,069,038 | 12/1962 | Ahlbin | 280/414 R |
| 3,124,259 | 3/1964 | Goettl | 9/1 T |
| 3,130,842 | 4/1964 | Melloni | 214/84 |
| 3,138,271 | 6/1964 | DeLay et al. | 214/84 |
| 3,228,543 | 1/1966 | Cowan | 214/84 |
| 3,447,815 | 6/1969 | West | 214/84 |
| 3,603,465 | 9/1971 | King | 280/414 R |
| 3,812,988 | 5/1974 | Pyle | 214/84 |

FOREIGN PATENTS OR APPLICATIONS

| | | | |
|---|---|---|---|
| 274,946 | 10/1913 | Germany | 280/414 R |
| 708,591 | 6/1966 | Italy | 280/414 R |

*Primary Examiner*—Trygve M. Blix
*Assistant Examiner*—Charles E. Frankfort
*Attorney, Agent, or Firm*—Wells, St. John & Roberts

[57] ABSTRACT

A boat trailer utilized particularly for transporting "shoal" or shallow keel sailboats behind a towing vehicle. The trailer includes a series of central keel rollers that receive and provide support for the sailboat along its fixed longitudinal keel. On either side of the keel rollers are resilient elongated bunks for engaging the sailboat hull and providing some support as well as preventing lateral tipping of the sailboat when held in a loaded condition. The resiliency of the bunks enables them to conform intimately to the hull of the sailboat. The bunks include areal hull engaging surfaces over which the weight of the boat is evenly distributed. Toggle mechanisms are provided at rearward ends of the bunks and are operable to laterally separate the rearward bunk ends. When operated, the bunks may be moved between a substantially parallel operative orientation whereat the boat hull is provided maximum support, and inoperative positions wherein the bunks are spaced laterally further apart at their rearward ends and converge forwardly to their forward ends. The latter position facilitates loading and unloading of the sailboat.

7 Claims, 7 Drawing Figures

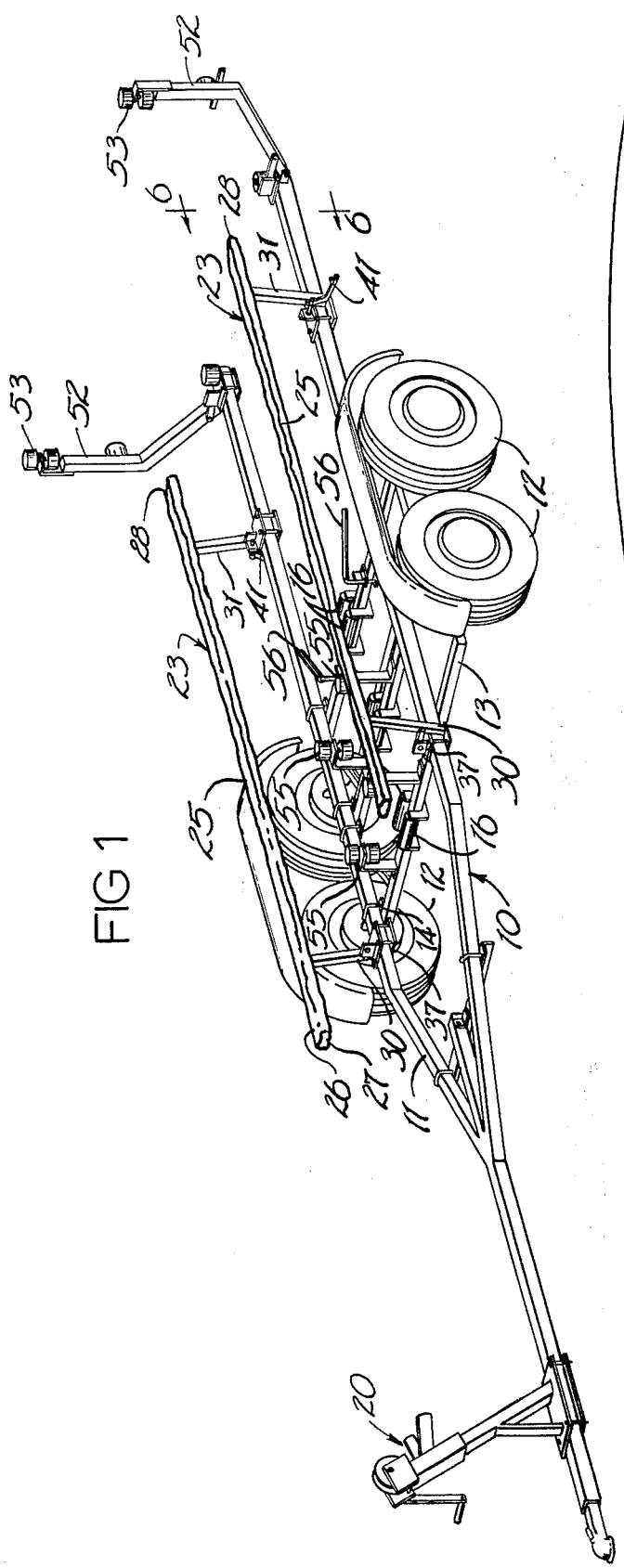
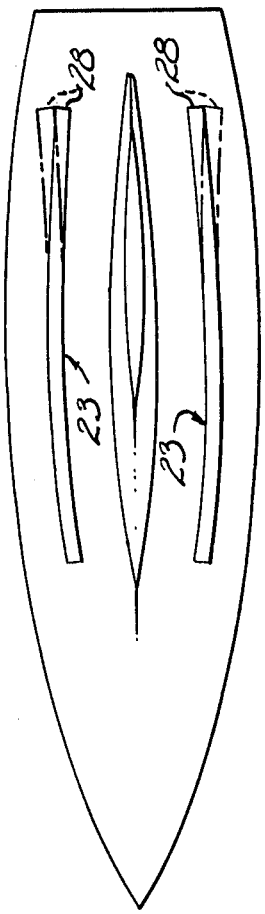
FIG 1
FIG 2

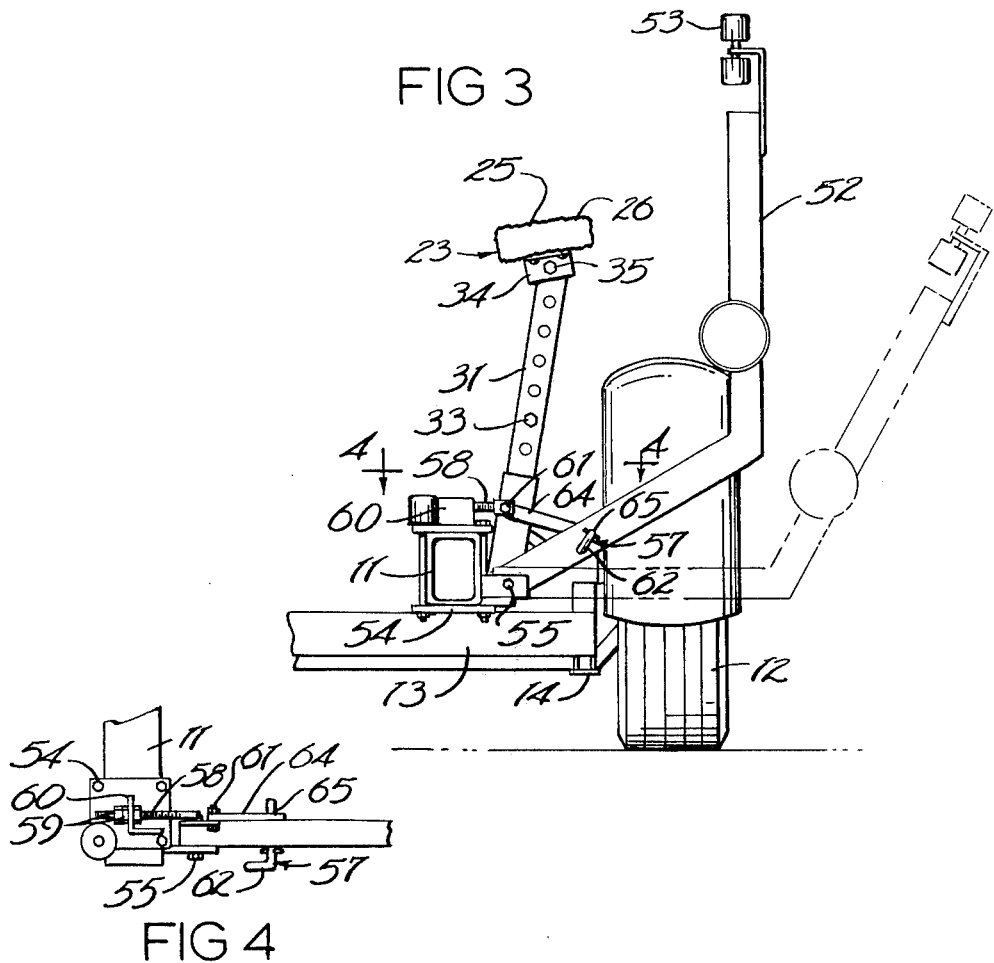
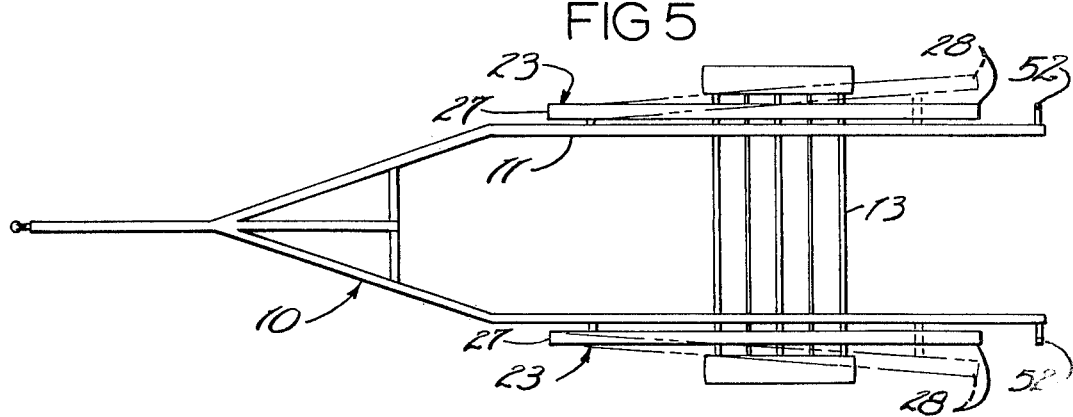

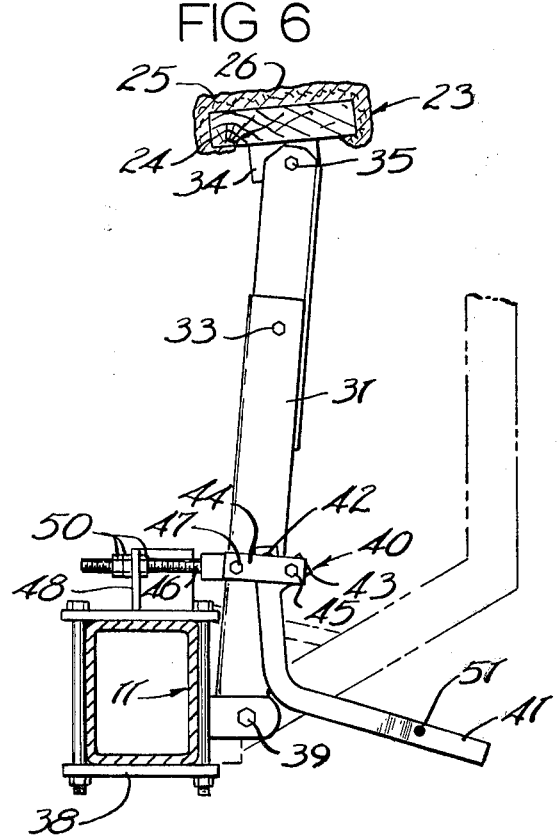
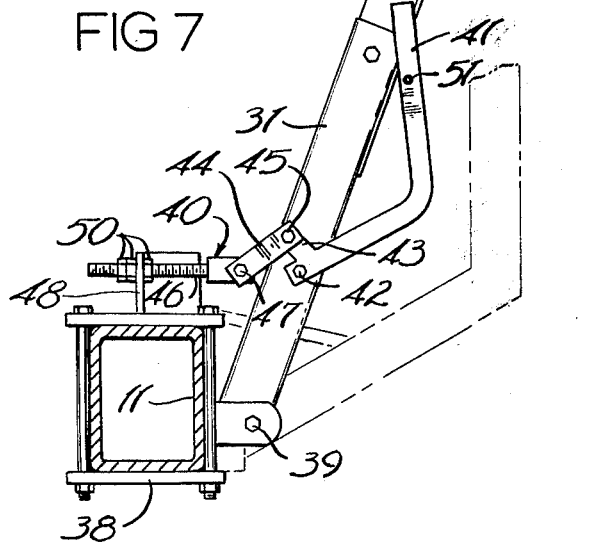

BOAT TRAILER

BACKGROUND OF THE INVENTION

The present invention is related to trailers and more specifically to trailers utilized to carry a watercraft behind a towing vehicle.

Some difficulty has been experienced in loading and unloading of sailboats to boat trailers. It has been found that the usually fragile hulls of such boats are easily damaged while being carried on a trailer especially while being loaded and unloaded from the trailers. "Shoal keel" or shallow keel sailboats generally have a rather short elongated stationary keel of considerable weight. With this type of boat, hull strength is greatest adjacent the keel. However, when held on an ordinary trailer, such boats are ordinarily supported on opposite sides of the keel. Previous trailers also have utilized a stationary "form fitting" bunk arrangement that is preformed to conform to the hull shape of the particular boat to be carried. The rigidity of the bunks necessitates that the boat be held in a precise position on the trailer in order that its weight is evenly distributed thereon. Further, because the bunks are concave in shape with the forward and rearward ends pointing substantially upwardly, the trailer must be nearly completely submerged before the sailboat held thereby may be moved onto or off of the trailer. Thus it is often necessary to provide an additional trailer tongue that enables extension of the distance between the trailer and towing vehicle, thereby allowing movement of the trailer into deeper water when necessary. If the trailer is to be loaded onto a submerged or nearly submerged trailer much difficulty is experienced in correctly positioning the boat over the submerged hull engaging members.

U.S. Pat. No. 3,124,259 discloses a floating boat trailer that includes laterally pivotable hull engaging members. The members however are straight and rigid along their lengths. They will not conform to a rounded hull configuration. Further, movement of the hull engaging members raises and lowers the boat on the trailer framework and does not move their ends laterally clear of the boat hull for loading and unloading purposes.

The present trailer includes longitudinal resilient bunks that are carried for lateral pivotal movement on a central supporting trailer framework. The bunks are therefore free to flex in response to the weight of the boat thereon and to conform to the hull shape. Before the boat is unloaded or loaded, the bunks are separated at their rearward ends, allowing freedom of longitudinal movement of the boat hull. The resilient bunks will flex, preventing accidental gouging of the boat as it is moved onto or off the trailer. When loading, the hull may engage the bunks and bend them slightly downwardly as the boat is pulled onto the trailer. Similarly, when unloading a sailboat, as the trailer is being backed into the water, the bunks will return to a relatively normal flat condition as bouyancy of the boat reduces the load applied thereto. The boat may float freely over the bunks once they return to a flat condition with no danger of the hull scraping against an upturned bunk end. When loaded onto the trailer, the bunks may be pivoted into operative parallel positions in order to provide some support and lateral stability to the boat hull.

SUMMARY OF THE INVENTION

A boat trailer is described that includes a wheel supported framework adapted to receive the weight of a boat and to be moved along by a towing vehicle. The framework includes a bow securing means mounted at the forward end of the framework for engaging the bow of a boat when held in a loaded position on the trailer. The bow securing means also prevents longitudinal motion of the boat relative to the trailer. Longitudinally resilient bunk means are movably mounted on opposite longitudinal sides of the framework and include areal hull engaging surfaces thereon. These surfaces are resilient to conform intimately to the hull configuration to provide support and prevent lateral tipping of a boat when in a loaded condition on the trailer. Central support means on the framework receive and support a major portion of the boat's weight. A mounting means interconnects the bunk means and framework. The mounting means is operative to move the bunk means between boat carrying positions and boat loading and unloading positions. In the carrying positions, the bunk means are substantially parallel to one another. In the loading and unloading positions, the bunks converge forwardly from laterally spaced rearward ends.

It is a first object of the present invention to provide a boat trailer that enables loading and unloading of a boat in relatively shallow water.

It is another object to provide such a trailer that includes flexible resilient bunk supports and central keel rolls that enable loading and unloading of a boat without danger of gouging or scratching the hull surface thereof.

A still further object is to provide such a trailer that includes several adjustments to enable custom fitting of the boat supporting portions thereof to accommodate boats of different shaped boat hulls.

Another object is to provide such a trailer that is relatively simple in construction and therefore substantially maintenance free.

These and still further objects and advantages will become apparent upon reading the following detailed description which, taken with the accompanying drawings, describe a preferred form of my invention.

BRIEF DESCRIPTION OF THE DRAWINGS

FIG. 1 is a pictorial view of the present trailer;

FIG. 2 is a reduced schematic bottom plan view diagrammatically illustrating operation of the bunk means;

FIG. 3 is an enlarged fragmentary view showing the rearward end of one side of the trailer;

FIG. 4 is a sectional view taken along line 4—4 in FIG. 3;

FIG. 5 is a schematic plan view of the trailer showing different operational positions thereof;

FIG. 6 is an enlarged sectional view taken along line 6—6 in FIG. 1; and

FIG. 7 is a view similar to FIG. 6 only showing different operational positions of the elements shown therein.

DETAILED DESCRIPTION OF A PREFERRED EMBODIMENT

A trailer comprising a preferred form of the present invention is illustrated in the drawings and is designated therein by the reference numeral 10. Basically, the trailer 10 includes a central longitudinal frame 11 supported by freely rotatable wheels 12. The wheels 12 are carried by an axle carriage 13 that is mounted to frame 11 through adjustable brackets 14.

The trailer 10 is designed particularly to provide transportation over land for shallow keel type sailboats. When mounted in a loaded position on the trailer 10, much of the sailboat weight will be supported by a plurality of keel rolls (FIG. 1) that are rotatably mounted directly on frame 11. A bow securing means 20 is provided at the forward end or tongue of frame 11 to secure the bow of the boat and prevent longitudinal movement of the boat along the trailer. Also, support is provided through a bunk means 23 that is situated on opposite longitudinal sides of the keel rolls 16. The bunk means 23 provide some support, but are primarily to prevent lateral tipping of the boat held thereon. The boat is further held secure laterally by side hull supports 52.

Looking now to the above generally described features in greater detail, reference will first be made in particular to FIGS. 1, 6 and 7. These figures show bunk means 23 as being formed of longitudinal planks 24. The planks 24 are resilient longitudinally between ends 27 and 28 and will deform to intimately engage the hull configuration of a boat supported thereon. Each plank 24 is covered with a carpet material 25 to cushion the boat hull while it is carried or being loaded or unloaded from the trailer 10. The planks 24 are selected to be sufficiently resilient to deform under a specified weight in order that a portion of the load applied by the boat be evenly distributed over hull engaging surfaces 26 of the cushioned planks.

The planks 24 are held at front and rearward ends 27 and 28 elevationally above the main frame 11 by a front and rearward pair of uprights 30 and 31. Each upright 30, 31 telescopes upwardly and each may be elevationally adjusted by selective positioning of an adjusting bolt 33. The undersides of planks 24 are provided with mounting brackets 34 (FIGS. 6 and 7) that are attached by bolts 35 to the uprights 30 and 31. Brackets 34 and bolts 35 cooperate to enable pivotal movement of planks 24 about a longitudinal axis. A loose fit between bolts 35 and brackets 34 allows for bending along the plank lengths.

The front uprights 30 are mounted to framework 11 through brackets 37 that are clamped by bolts to the framework. The rear uprights 31 are also adjustably mounted to the framework 11 by a set of rear brackets 38. However, the rear brackets 38 include additional means for mounting a toggle mechanism 40 that is operable to spread the bunks from an operative parallel position to an inoperative rearwardly diverging position. The rear uprights 31 are mounted to brackets 38 and pivots 39.

The toggle means 40 is shown in substantial detail by FIGS. 6 and 7. As shown, the toggle means is comprised of a crank arm 41 mounted at a pivot 42 to the rear upright 30. The crank arm 41 includes an offset lever arm 43. A connector 44 is mounted to lever arm 43 at a pivot 45. The remaining end of connector 44 is pivotably mounted to an adjustable connector at a third pivot 47. The rear brackets 38 also include upright flanges 48 that receive a threaded shank portion of the adjustable connector 46. Nuts 50 are provided on either side of the bracket to secure the connector 46 thereto. Adjustment of the nuts 50 along the threaded shank enable selective adjustment of the angular movement of the rear plank ends 28 in response to operation of the crank arm 41.

FIGS. 6 and 7 show one crank arm 41 and pivotal movement thereof between two operative positions. Pivotal movement of crank arms 41 between these positions operates the toggle linkage between frame 11 and uprights 31 to cause corresponding movement of the bunk means between the operative and inoperative positions (FIGS. 2 and 5). Looking at FIG. 6, it may be seen that pivots 45 and 47 define a line passing below pivot 42. Therefore, a load on the associated bunk will produce a clockwise moment against arm 41, urging it to pivot about axis 42 toward framework 11. This movement is restricted however by bracket 38 which comes into abutment with the arm.

In FIG. 7, the pivots 45 and 47 are located above pivot 42 and, therefore, a counterclockwise moment is produced about pivot 42 to urge arm 41 toward the boat hull. This movement is restricted by a roll pin 51 mounted on arm 41 for abutment with upright 30.

Near the rear of the frame 11 are a pair of side hull supports 52 as briefly mentioned above. The side hull supports are shown in particular detail by FIGS. 3 and 4. Each support 52 includes a roller assembly 53 that is utilized to engage upright sides of a boat hull and to provide lateral stability thereto. Supports 52 are mounted to the central framework 11 through mounting brackets 54 and pivot thereon about the axes of bolts 55.

A release means 57 extends between the frame 11 and supports 52 to enable pivotal movement thereof between an inoperative hull-engaging position and a laterally spaced position clear of the boat hull. The release means includes a threaded shaft 58 connected at a pivot 61 to one end of an arm 64. The remaining end of the arm 64 is connected at another pivot 65 to the support 52. A bracket 50 is held stationary relative to the frame 11 and receives the shaft 58 through an aperture formed therein. Nuts 59 are located on opposite sides of the bracket 60 to enable lateral adjustment of the shaft relative to the bracket 60. This adjustment facilitates positioning of the rollers 53 laterally in relation to the boat hull surface.

The arm 64 is connected to the support 52 by a release pin 62 that defines pivot 65. Pin 62 extends through appropriate apertures within the support 52 and arm 64. Once the pins 62 are removed from these apertures, the supports 52 may pivot freely about the axes of bolts 51 between operative and inoperative positions shown by solid and phantom lines in FIG. 3.

FIG. 1 shows a plurality of vertically oriented rollers 55 that are utilized to center a boat on the frame 11. They do this by engaging and rolling against the upright sides of a sailboat keel as it is moved onto or off of the trailer. To assist the centering function of the rollers 55, a pair of forwardly converging guide rods 56 are provided. Rollers 55 receive the forward keel end and guide it between rollers 55 as the boat is being loaded onto the trailer.

From the above detailed description, a more thorough understanding of rhe operation of the present trailer may be had. In order to unload a boat from the present trailer, an operator first removes the pins 62 and pivots the side hull supports 52 laterally away from engagement with the boat hull. He then operates the crankarms 41 to move the bunks 23 apart at their rearward ends 28. Ends 28 are shown in this position by FIG. 2 in phantom lines. The spread ends facilitate passage of the boat hull therebetween. The V-shaped converging bunks further assist in centering during its movement relative to the trailer.

Once the bunks have been pivoted outwardly to the inoperative position, the user then backs the trailer into the water until the boat becomes at least partially supported on the water surface. The decreased load on the resilient planks 24 allows them to move to a straightened condition. In this condition, the rearward plank ends do not present any obstruction to the rearward path of the hull as the boat is moved longitudinally and rearwardly off the trailer. Nor do the straight hull engaging surfaces 26 offer any substantial frictional resistance against the rounded boat hull.

It should be noted at this point that the trailer need not be backed into extremely deep water in order to completely float the boat above the trailer for unloading purposes. Since the planks are resilient, the previously upwardly projecting rearward ends 28 deflect downwardly as the boat weight is lifted therefrom. Further, surfaces 26 that previously conformed to the hull shape will not only touch the hull tangentially.

Once the boat has been unloaded and detached from the trailer, the operator may then pull the trailer out from the water and onto dry land.

In order to load a boat onto the trailer, the user first assures himself that the side hull supports are in a laterally outward spaced position and that the bunks are in the laterally spaced inoperative position. He may then back the trailer into the water at approximately the same depth as that required for unloading the boat. The boat is then maneuvered onto the framework 11 and moved longitudinally, the keel being guided between the bars 56 and rolls 55, and onto the keel rolls 16. This movement is facilitated not only by the guide bars 56 and rolls 55 but also by the V-shaped configuration assumed by the bunks 23 held in the inoperative position.

Once the boat is longitudinally in place on the trailer, the bow is secured by means 20 and the trailer is pulled up onto dry land. After doing this, the operator may then pivot the crank arms 41 to operate toggle means 40 to move the bunk means 23 back to the operative parallel position. In doing so, the planks become completely and intimately engaged from end to end (FIG. 2, solid lines) along the hull surface on opposite sides of the keel. The planks 24 deflect downwardly, conforming to the hull configuration and receive a portion of the total boat weight evenly along the hull engaging surfaces 26, although the primary load is received by keel rollers 16.

The side hull supports 52 are then pivoted back to engage the rollers 53 along the sides of the boat hull. The pins 62 are replaced to secure the side hull supports 52 in this operative position to secure the boat hull against lateral movement. This completes the boat loading operation.

It may have become evident upon reading the preceeding description and upon examination of the accompanying drawings, that various changes and modifications may be made therein. It should be understood however that this description and drawings are given only to describe a preferred form of the present invention. Therefore, only the following claims are to be taken as definitions of the present invention.

What I claim is:

1. A boat trailer for carrying a shallow keel type sailboat having a central elongated keel of substantial weight and a hull having a front bow and a contoured lower hull configuration formed along the respective sides of the keel, comprising:

a wheel supported framework having a forward end adapted for connection to a towing vehicle;

bow securing means mounted to the forward end of the framework for selective engagement of the bow of a boat while in a loaded position on the trailer;

a plurality of keel rolls rotatably mounted to the framework along the longitudinal central portion thereof, said keel rolls being adapted to engage and support the keel of a boat;

elevated longitudinal bunk means movably mounted to the framework along opposite transverse sides of the keel rolls, said bunk means having forward and rear ends, each bunk means comprising an elongated normally horizontal member of flexible material having a upwardly facing areal hull-engaging surface for flexibly bending to conform to the lower hull configuration of a boat at the sides of its keel and for preventing lateral tipping of a boat while in a loaded condition on the trailer;

forward upright bunk supports mounted to the framework, said forward upright bunk supports being pivotably connected to the forward ends of the respective bunk means;

rear upright bunk supports pivotally mounted to the framework, said rear upright bunk supports being connected to the rear ends of the respective bunk means;

and means operatively connected between the rear upright bunk supports and the framework for selectively pivotally moving the rear upright bunk supports relative to the framework for varying the transverse spacing between the rear ends of the bunk means between boat carrying positions wherein the bunk means are substantially parallel to one another for flecible engagement against the hull of a boat while in a loaded condition on the trailer and boat loading or unloading positions wherein the bunk means converge forwardly from laterally spaced rear ends in substantially horizontal positions to clear the boat hull.

2. A boat trailer as set out in claim 1 wherein said means for selectively pivotally moving the rear upright bunk supports relative to the framework comprises:

toggle mechanisms at the respective rear ends of the bunk means and connecting the rear upright bunk supports to the framework for pivoting the respective rear ends of the bunk means relative to the framework between the boat carrying positions and the boat loading and unloading positions.

3. A boat trailer as set out in claim 1 further comprising:

side hull supports pivotally mounted to said framework outwardly adjacent to the rear ends of said bunk means, said side hull supports being selectively movable between a first position adapted to engage opposite sides of a boat hull while in a loaded position on the framework to thereby prevent lateral movement of a boat relative to the trailer, and a second position laterally clear of the boat hull; and upright rollers rotatably mounted to the hull supports for rotatable engagement against the hull of a boat.

4. A boat trailer as set out in claim 3 further comprising:

adjustable release means connected between the side hull supports and said framework for selectively positioning said upright rollers relative to the framework when the side hull supports are located in their respective first positions and for selectively releasing the side hull supports to permit their movement to their respective second positions.

5. A boat trailer as set out in claim 1 further comprising:

upright keel guide rolls rotatably mounted to the framework for rotation about upright axes along the transverse side of said first-named keel rolls, said upright keel guide rolls being adapted to engage and longitudinally guide the central keel of a boat while being loaded and unloaded from the trailer.

6. A boat trailer as set out in claim 5 further comprising:

forwardly converging guide keel rods mounted to the framework rearward of the upright keel guide rolls for receiving and directing the keel of a boat toward the first-named keel rolls and upright keel guide rolls while a boat is being loaded or unloaded from the trailer.

7. A boat trailer as set out in claim 1 wherein said means for selectively pivotally moving the rear upright bunk supports relative to the framework comprises:

toggle mechanisms at the respective rear ends of the bunk means and connecting the rear upright bunk supports to the framework for pivoting the respective rear ends of the bunk means relative to the framework between the boat carrying positions and the boat loading and unloading positions;

said toggle mechanisms each being comprised of:

a crank arm pivoted at one end to a rear upright bunk support and having a lever arm protruding therefrom;

a connecting member pivotally mounted at one end to the lever arm for movement about the pivot axis of the crank arm;

an adjustable connector assembly mounted to the framework, the adjustable connector assembly being pivotably connected to the remaining end of the connecting member; and said rear upright bunk support having a lower end pivotally mounted to the framework about a longitudinal horizontal axis for pivotal movement of the rear upright bunk support about said last-named axis in response to operation of the crank arm.

* * * * *